Oct. 19, 1943.  F. E. WOOD ET AL  2,331,950
GAS HEATER
Filed Dec. 4, 1939   2 Sheets-Sheet 2

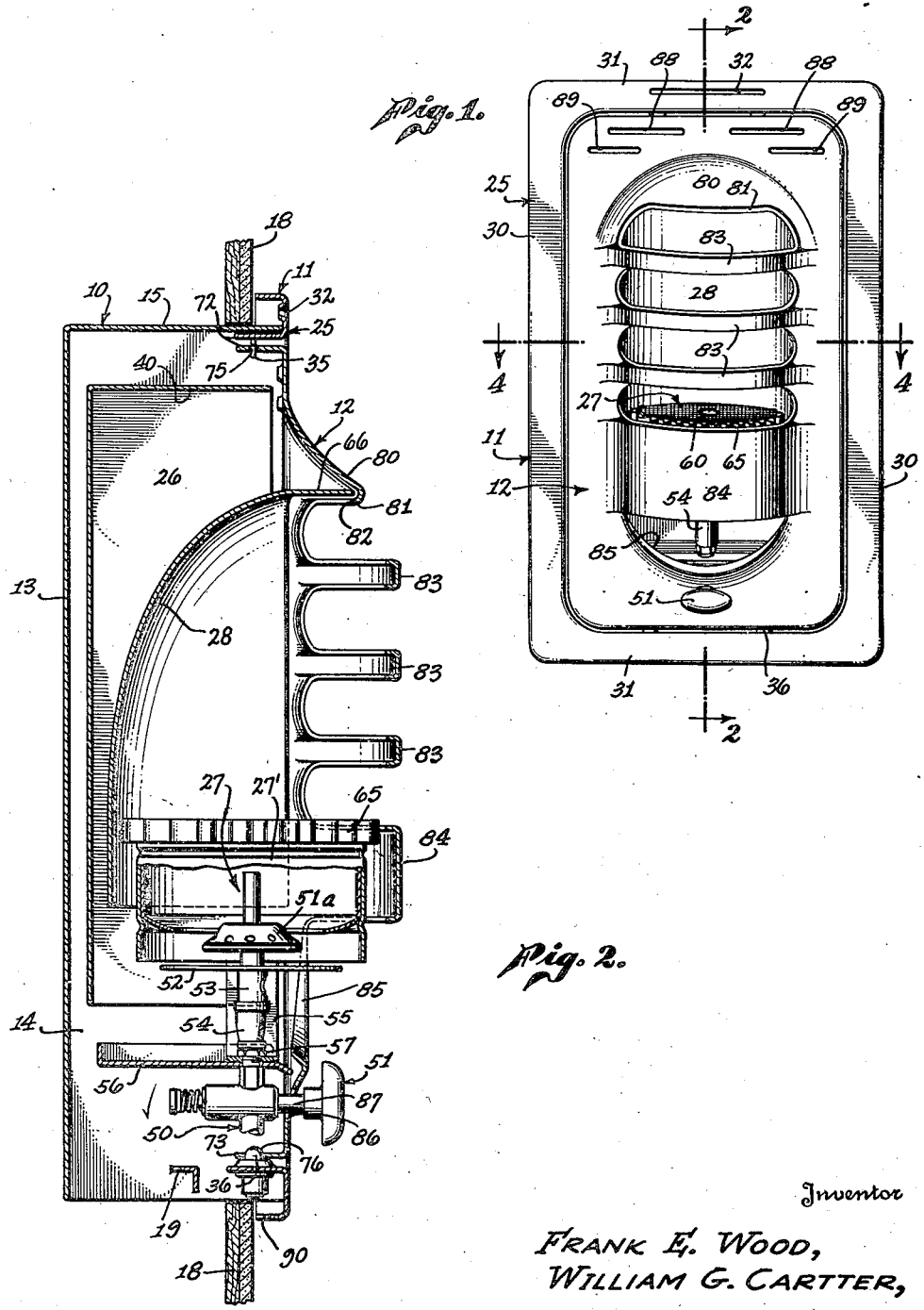

Inventor
FRANK E. WOOD,
WILLIAM G. CARTTER,

Patented Oct. 19, 1943

2,331,950

UNITED STATES PATENT OFFICE 2,331,950

GAS HEATER

Frank E. Wood and William G. Cartter, Monrovia, Calif., assignors to Day and Night Water Heater Co., Ltd., Monrovia, Calif., a corporation Application December 4, 1939, Serial No. 307,434

6 Claims. (Cl. 126—92)

Our invention relates to heating apparatus and particularly to gas heaters of a type suitable for installation in the wall of a room.

It is an object of our invention to provide a wall gas heater which combines circulating and radiant heat, part of the heat from the burner being distributed by induction, and part being distributed through the agency of a radiant mantle the heat from which is reflected and radiated toward the region to be warmed.

There is a tendency of previous wall heaters with which we are familiar to dissipate too much heat into the wall immediately adjacent to the heater, due to contact of the metal parts of the heater with the wall structure and inadequate air vents and heat insulating spaces. This results not only in added fuel consumption but discoloration or bleaching of the wall.

It is therefore another object of our invention to provide a gas heater of the type described which embodies air vents and heat insulating spaces of such design as to effectively insulate the wall structure from the burner element of the heater.

We have also observed a tendency in heaters of this type to crack the paint or enamel on the frame of the heater especially above the burner, and to badly discolor it.

Therefore, another object is to provide in a heater of the character described a radiant mantle in association with a heat reflector of a novel design, which reflects the radiant heat into an area on a plane near the floor of the room, thereby insuring proper distribution of heated air, as well as eliminating wall discoloration and the cracking or discoloring of paint or enamel on the frame of the heater.

A further object of our invention is to provide a heater of the character described, which is manufactured in units facilitating installation and assembly at the place of use.

An additional object is to provide in a heater of the character described a removable front or grill, which combines the functions of ornamentation, protection and certain other functions to be described, and which, upon removal, renders the burner assembly readily accessible.

Another additional object of our invention is to provide in a heater of this type a frame and grill of light weight metal, which can be pressed and conveniently enameled in units.

A further additional object is to provide in a heater of this character a frame to be mounted in a wall, and a grill removably secured to the frame in a manner accommodating expansion and contraction of the grill in the frame.

Further objects and advantages will become apparent from the following description, taken in connection with the drawings.

In the drawings,

Figure 1 is a front perspective view of our heater.

Figure 2 is a vertical section of the heater, taken on the line 2—2 of Figure 1 and is shown installed in a fragment of wall structure.

Figure 3:
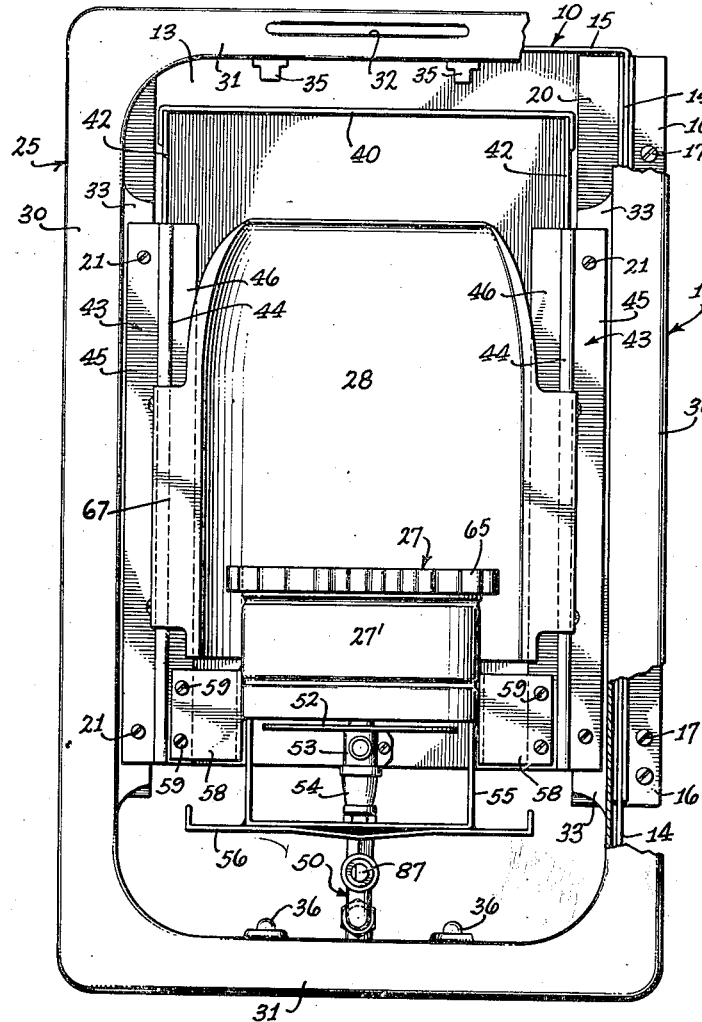
Figure 3 is a front elevation of the heater, with the front or grill removed.

Our heater is preferably made in three principal units, designated a rough-in box 10, a frame assembly 11 and a front or grill 12.

The rough-in box 10 comprises a sheet metal housing, consisting of a back 13, sides 14, and a top 15. This housing is open at the front and at the bottom. At the forward edges of the sides 14 are welded or otherwise secured angle brackets 16 formed with holes by which nails or screws 17 may be employed to mount the rough-in box on a wall 18, in which an opening of suitable dimensions to freely accommodate the box has been previously made. It is desirable to have a slight clearance between the sides of the box and the adjacent wall structure. A horizontal angle member 19 extends between the walls 14 at the lower end for the purpose of spacing and bracing the walls at this point.

Secured to the forward edges of the walls 14 on the inside by welding or any other suitable means, are vertical brackets 20 provided with suitably spaced holes for the reception of screws 21, the function of which is later described.

The frame assembly 11 comprises in general a frame 25, an inner box 26, a burner assembly 27, and a reflector 28.

The frame 25 is preferably fabricated of sheet steel pressed in the rectangular form illustrated in the drawings. This frame has exposed vertical members 30 and horizontal members 31, which define a rectangular area having rounded corners as illustrated. The upper horizontal member 31 is formed with a slot 32 for ventilating purposes as later explained. The members 30 and 31 are U-shaped in cross-section, forming in effect an enlarged bead raised from the wall surface in which the heater may be installed. The frame may be enameled, or otherwise treated on the exposd surface to give it the desired ornamental appearance.

Figure 4:
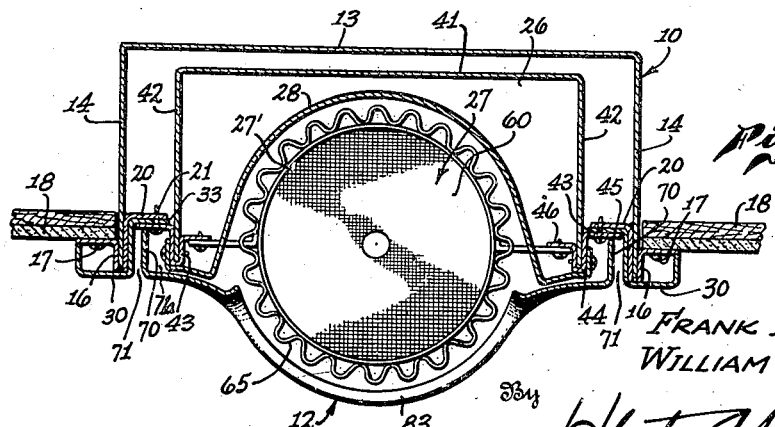
Figure 4 is a horizontal section of the heater, taken on the line 4—4 of Figure 1.

Vertical members 30 are formed with inner flanges 33, recessed to a depth sufficient to rest upon brackets 20 when the outer portions of the members 30 engage the forward edge of bracket as may be seen in Figure 4. The flanges 33 are provided with the holes corresponding in position and size to the holes in brackets 20.

Tongues 35 are struck down from the lower edge of the upper member 31 to aid in securing the grill 12 in place, as will be subsequently explained. Mounted on the lower member 31 is a pair of conventional spring catches 36, which cooperate with the grill and the tongues to removably hold the grill in position.

The frame forms an ornamental enclosure over the area where the rough-in box and the wall join, and the rough-in box supports the inner box 26, the burner assembly 27 and the reflector 28.

The inner box 26 has a top 40, a back 41, and sides 42, which are spaced from the top, back and sides respectively of the rough-in box 10. This inner box 26, like the rough-in box, is open at the front and bottom.

Extending for a substantial portion of the vertical length of the inner box 26, and secured to the marginal edges of the sides 42, by welding or in any desired manner, are vertical brackets 43 which have a central U-shaped section 44 that fits over the sides 42. These brackets 43 also have lateral outward extensions 45 and inward extensions 46.

The extensions 45 are formed with holes corresponding to the holes in brackets 20 and flanges 33, these two latter elements and the flange 45 being united by screws 21. The inner box 26 is thus supported by the rough-in box 10.

The burner assembly 27 is, in turn, supported by the inner box 26. This burner assembly comprises a conventional fuel supply pipe 50 and valve 51, above which pipe is positioned a burner 51a of any desired type. Below the burner is a heat deflecting disc 52, resting on an air shutter 53, which is coupled to an upwardly extending nipple 54 of the supply pipe 50. The supply pipe passes through a U-shaped bracket member 55 and a protecting shield 56 and is positioned on the bracket and protecting shield by a nut 57. The U-shaped bracket 55 is welded or otherwise attached to a cylindrical housing 27' which encloses the burner. Welded or otherwise attached to this cylindrical housing are ears 58, which extend outwardly on opposite sides into engagement with the bracket member 43, to which they are secured by screws 59, as illustrated. The burner assembly is thus supported upon the inner box 26.

The protecting shield 56 prevents sparks or burning matter falling into the partition or wall.

Secured in the upper part of the housing 27' is a radiant mantle 60, of any desired design and material, such as, for example, a wire screen or a cellular plate. Various forms of radiant mantle are suitable for this purpose, a very satisfactory form being shown and described in our copending application, Serial No. 259,533, filed March 3, 1939. Heat from the burner will cause the mantle to glow, the flame of the burner being obscured thereby. The burner assembly itself is also described and illustrated in greater detail in that co-pending application.

We may employ a corrugated metallic heat dispersing element 65 by mounting it upon the outer surface of the housing 27'. This is not essential to our invention, however, and may be omitted.

The reflector 28 extends from a point about midway up the housing 27', where it is semi-cylindrical in cross-section to a point somewhat below the top 40 of the inner box 26. The semi-cylindrical cross-section of the reflector extends a substantial distance up from its lower end and thereafter its diameter diminishes in a parabolic curve. At the extreme upper end there is an outward horizontal flare or lip 66. The lip 66 is curved and protrudes outwardly a substantial distance from the forward edge of the frame 25. The reflector is spaced from the rear wall and sides of the inner box 26 and also from the cylindrical burner housing 27'. The reflector is formed with wings 67 which are screw mounted on the flanges 46.

The grill 12 is preferably stamped out of sheet steel and finished outside with enamel or other decorative treatment to harmonize or contrast with the frame 25. It is formed so that external flanges 70 thereof extend into the recesses between the bracket 30 and the bracket 43, leaving a normal clearance 71 between the bracket 30 and the flange 70, and a normal clearance 71a between the flange 70 and the bracket 43. This clearance accommodates expansion and contraction of the grill. At the upper and lower ends of the grill, flanges 72 and 73 respectively, which merge with the flanges 70, extend inwardly a slightly greater distance than the latter. The flanges 72 are formed with slots 75 adapted to receive the lugs 35, and the flange 73 is formed with holes 76 adapted to receive the spring latches 36, the combination of lugs 35 and latches 36 sufficing to removably secure the grill in place on the frame.

The grill is formed with an over-hanging lip 80 which slopes downwardly with a curved lower edge 81. This lower edge corresponds in shape and position with the edge of the horizontal lip 66 on the reflector, and an inturned edge or beading 82 on the lip 80 makes a substantial seal with the edge of the horizontal lip 66.

Spaced relatively narrow circular guard members 83 extend outwardly from the plane face of the grill, and a wider circular web 84 in the same cylindrical plane as the extensions 83 is formed near the lower end of the grill, being located adjacent the burner housing 27'. This circular web 84, in conjunction with the lower part of the reflector 28, forms in effect a cylindrical enclosure for the upper portion at least of the burner housing 27'.

A half-moon opening 85 is provided in the grill below the circular web 84, and a hole 86 accommodates valve stem 87.

Ventilating apertures 88 and 89 are formed in the grill 12 adjacent its upper end, and preferably are in the form of horizontal slots parallel to the slot 32 in the heater frame.

The frame 25 has an auxiliary ventilating slot 90 formed in the bottom flange of the lower element 31.

The heater has been described in units to indicate more clearly the nature of its construction and manner of assembly. Thus, the rough-in box 10 is first mounted in the wall, the frame assembly is installed in the rough-in box, the gas couplings connected, and, lastly, the grill is sprung into place and the heater is ready for use.

In operation, air for combustion is supplied to the burner 27 through the open lower ends of the rough-in box 10 and the inner box 26. Air reaching the burner through these channels comes up through the wall from outside the room. Air is also supplied through the half-moon opening 85 in the grill, and a small amount also passes through the ventilating slot 90 at the lower end of the frame 11, the latter two air sources deriving their supply from the room in which the heater is located.

The heat from the burner assembly is of two types, circulating heat and radiant heat. Air heated by the burner circulates by induction up and is deflected outwardly by the reflector, also from the boxes through slots 88, 89 and 32, a circulating hot air current being thus maintained in the room. Radiant heat from the mantle strikes the reflector and is reflected outwardly and some of it downwardly in the same manner that the radiant heat from an electric coil is reflected. The novel form of the reflector insures a radial dispersion of heat in a substantially horizontal plane, some of the heat being directed downwardly toward the floor of the room. The face of the reflector is preferably finished with a heat resisting aluminum finish, either applied to the metal or inherent in the material used.

The baffle 52 aids somewhat in reflecting the radiant heat upwardly in the direction of the reflector 28, and protects the elements below it from excessive heat, and the plate 56 offers further protection to the valve 50. There is a vertical space between the burner housing 27' and the reflector 28 through which heated air ascends to be deflected into the room. There are two vertical insulating spaces between the reflector and the wall contained within the heater itself, these being between the reflector 28 and the inner box 26 and between the inner box 26 and the rough-in box 10. Warm air originating in these areas naturally rises and passes outwardly through the ventilating slots 89, 88 and 32. It will be observed that the slots 89 are located below the top 40 of the inner box 26 in position to convey warm air currents forming between the reflector 28 and the inner box 26. The slots 88 are located above the top 40 of the inner box and permit passage of warm air formed between the box 26 and the rough-in box 10. As an additional ventilating medium any warm air circulating as high as the upper part of the frame 11 may pass out into the room through the slot 32. Circulation being thus provided for in separate channels, the air in the channels at progressive distances from the burner is progressively cooler. The burner heat may be intense, and the radiant mantle incandescent, yet the rough-in box will be but slightly warm to the touch.

The outward extending lip 66 of the reflector aids materially in protecting the upper part of the grill, frame, and wall from attack by either circulating or radiant heat, by reason of the fact that it deflects the circulating heat and reflects the radiant heat outwardly away from the upper part of the grill, frame and wall.

What we claim as our invention is:

1. A wall gas heater comprising a frame, a burner assembly supported within the frame, a concave heat reflector mounted within the frame behind the burner and having an upper portion substantially completely overlying the burner assembly, the extreme upper forward edge of the reflector extending beyond the frame, and a grill formed with a plane section fitting in the frame and a plurality of outwardly curved horizontal protective members with openings between for the passage of heat.

2. A gas heater comprising: a burner assembly, a heat reflector partially overlying and spaced from the burner assembly, an open box partially enclosing the reflector and spaced therefrom, a second open box partially enclosing the first box and spaced therefrom, a grill having a plane face covering the outer edges of the first box, the grill being provided with ventilating apertures communicating with the spaces between the reflector and first box and the first box and second box respectively, and a frame surrounding the grill and covering the outer edges of the second box.

3. A wall heater comprising: a rough in box adapted for installation in an opening in a wall, and having an inturned flange, an intermediate box supported on the flange within the rough in box and having an inturned flange and a burner supported on the last mentioned flange within the intermediate box.

4. A wall heater comprising: a rough in box adapted for installation in an opening in a wall, and having an inturned flange, an intermediate box supported on the flange within the rough in box, a burner mounted within the intermediate box, and a reflector mounted on the intermediate box and disposed between the intermediate box and the burner.

5. A wall heater comprising: a rough in box adapted for installation in an opening in a wall, and having an inturned flange, an intermediate box supported on the flange within the rough in box, a burner mounted within the intermediate box, a reflector mounted on the intermediate box and disposed between the intermediate box and the burner, and a protective grill detachably mounted on and disposed within the frame.

6. A wall gas heater comprising a frame, a burner assembly supported within the frame, a heat reflector mounted within the frame with its lower end behind the burner assembly, and a grill detachably mounted in the frame and having a base portion associated with the reflector to encompass the burner and an upper portion combining with the upper portion of the reflector to form a reflective pocket above the burner assembly adapted to disperse heat from the burner assembly outwardly in a substantially horizontal direction.

FRANK E. WOOD.
WILLIAM G. CARTTER.